United States Patent
Kim et al.

(10) Patent No.: US 9,258,830 B2
(45) Date of Patent: Feb. 9, 2016

(54) METHOD AND DEVICE FOR RANDOM ACCESS IN MOBILE COMMUNICATION SYSTEM

(75) Inventors: Hakseong Kim, Anyang-si (KR); Hanbyul Seo, Anyang-si (KR); Byounghoon Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 163 days.

(21) Appl. No.: 14/008,841

(22) PCT Filed: Mar. 28, 2012

(86) PCT No.: PCT/KR2012/002252
§ 371 (c)(1),
(2), (4) Date: Sep. 30, 2013

(87) PCT Pub. No.: WO2012/134155
PCT Pub. Date: Oct. 4, 2012

(65) Prior Publication Data
US 2014/0016534 A1  Jan. 16, 2014

Related U.S. Application Data

(60) Provisional application No. 61/468,068, filed on Mar. 28, 2011, provisional application No. 61/496,034, filed on Jun. 12, 2011.

(51) Int. Cl.
| | |
|---|---|
| H04H 20/71 | (2008.01) |
| H04W 74/08 | (2009.01) |
| H04L 5/00 | (2006.01) |
| H04W 74/00 | (2009.01) |

(52) U.S. Cl.
CPC ......... H04W 74/0833 (2013.01); H04L 5/0053 (2013.01); H04W 74/0875 (2013.01); H04W 74/006 (2013.01)

(58) Field of Classification Search
USPC ................ 370/252–280, 312–329, 352–462; 455/425–436
See application file for complete search history.

(56) References Cited

U.S. PATENT DOCUMENTS

| | | | | |
|---|---|---|---|---|
| 7,433,334 | B2 * | 10/2008 | Marjelund et al. | 370/329 |
| 8,194,694 | B2 * | 6/2012 | Kato et al. | 370/442 |
| 8,270,354 | B2 * | 9/2012 | Kim et al. | 370/329 |
| 8,437,291 | B2 * | 5/2013 | Park et al. | 370/329 |
| 8,446,859 | B2 * | 5/2013 | Kim et al. | 370/328 |
| 8,503,413 | B2 * | 8/2013 | Uemura | 370/338 |

(Continued)

FOREIGN PATENT DOCUMENTS

| | | |
|---|---|---|
| KR | 1020070107577 | 11/2007 |
| KR | 1020080018105 | 2/2008 |

*Primary Examiner* — Man Phan
(74) *Attorney, Agent, or Firm* — Dentons US LLP

(57) ABSTRACT

The present invention relates to a method for a terminal to execute a random access in a mobile communication system, and comprises the steps of: transmitting a random access preamble using a resource determined according to a random access setting for the terminal; and receiving a random access response including uplink approval information from a base station as a response to the preamble transmission, wherein the random access setting is determined by a group corresponding to the terminal from a first random access setting for a first terminal group or a second random access setting for a second terminal group, and a resource reserved for the second terminal group according to the second random access setting is used for transmission of the random access preamble or transmission of uplink data.

13 Claims, 16 Drawing Sheets

(56) References Cited

U.S. PATENT DOCUMENTS

| | | |
|---|---|---|
| 8,553,590 B2* | 10/2013 | Baldemair et al. ............ 370/280 |
| 8,619,682 B2* | 12/2013 | Park et al. .................... 370/329 |
| 8,811,336 B2* | 8/2014 | Chun et al. .................... 370/331 |
| 8,831,608 B2* | 9/2014 | Zheng et al. .................. 455/436 |
| 2002/0071480 A1 | 6/2002 | Marjelund et al. |
| 2010/0290407 A1 | 11/2010 | Uemura |
| 2011/0039552 A1* | 2/2011 | Narasimha et al. ........... 455/425 |
| 2012/0184306 A1* | 7/2012 | Zou et al. ..................... 455/458 |

* cited by examiner

FIG. 4
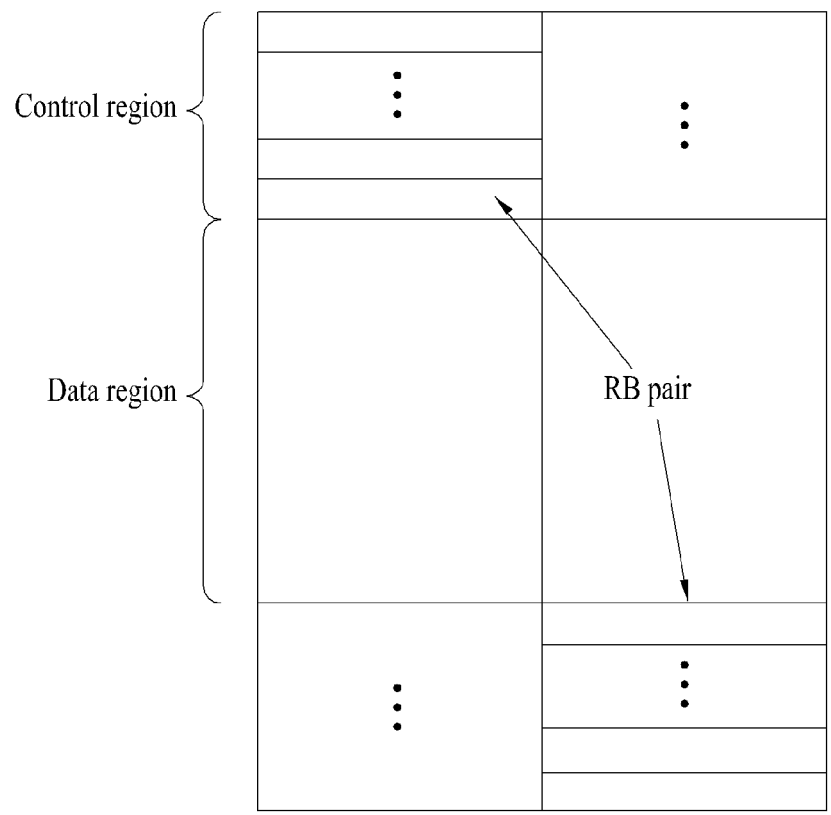
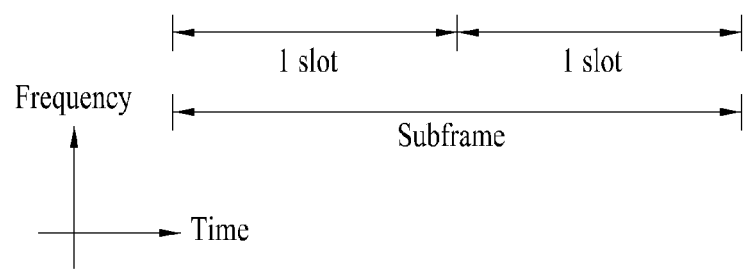

FIG. 12
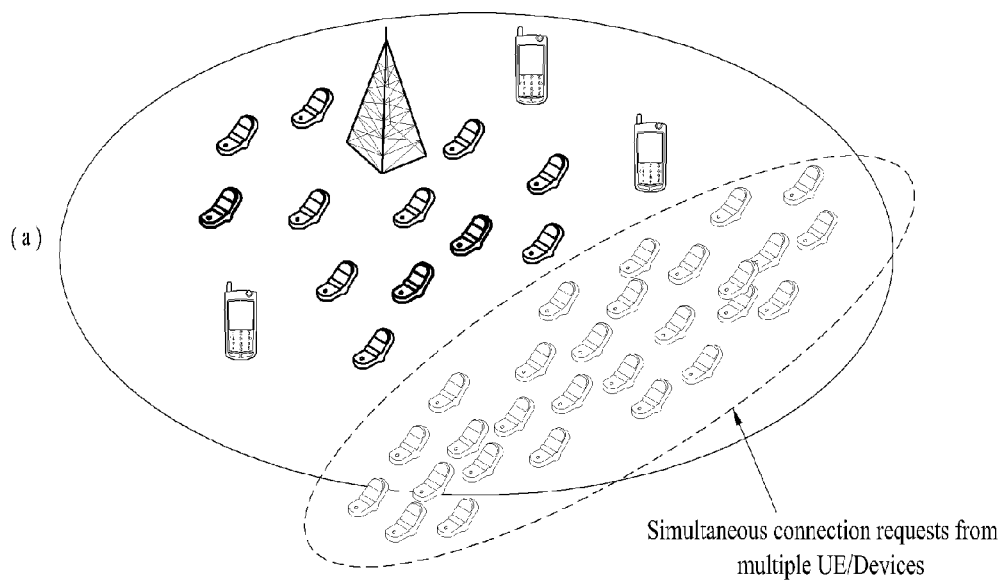
(a)
Simultaneous connection requests from multiple UE/Devices
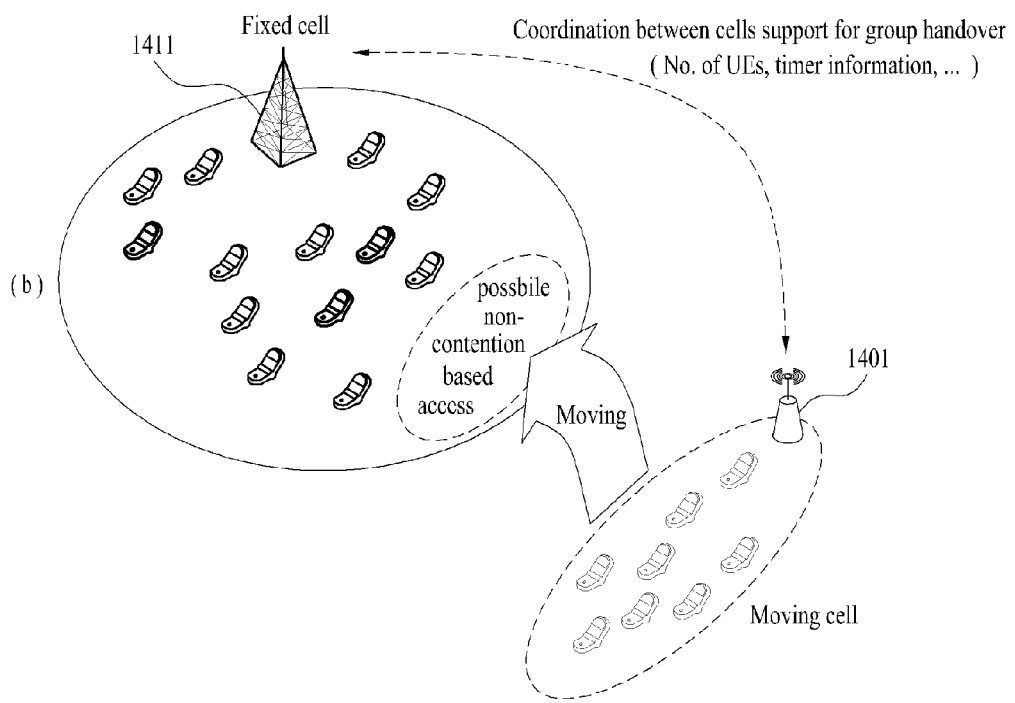
(b)
1411 — Fixed cell
Coordination between cells support for group handover (No. of UEs, timer information, ...)
possbile non-contention based access
Moving
1401
Moving cell

METHOD AND DEVICE FOR RANDOM ACCESS IN MOBILE COMMUNICATION SYSTEM

This application is a 35 USC §371 National Stage entry of International Application No. PCT/KR2012/002252 filed on Mar. 28, 2012, and claims priority of U.S. Provisional Application Nos. 61/468,068 filed on Mar. 28, 2011 and 61/496,034 filed on Jun. 12, 2011, which are hereby incorporated by reference in its entirety.

TECHNICAL FIELD

The present invention relates to a method of performing a random access procedure in a mobile communication system and apparatus therefor.

BACKGROUND ART

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of CDMA (code division multiple access) system, FDMA (frequency division multiple access) system, TDMA (time division multiple access) system, OFDMA (orthogonal frequency division multiple access) system, SC-FDMA (single carrier frequency division multiple access) system and the like.

DISCLOSURE OF THE INVENTION

Technical Task

The present invention relates to a temporarily performed random access procedure for a plurality of user equipments simultaneously accessing an eNode B region.

Technical tasks obtainable from the present invention are non-limited the above-mentioned technical task. And, other unmentioned technical tasks can be clearly understood from the following description by those having ordinary skill in the technical field to which the present invention pertains.

Technical Solution

According to a first technical solution of the present invention, a method of performing a random access, which is performed by a user equipment in a mobile communication system, includes the steps of transmitting a random access preamble using a resource determined according to a random access configuration for the user equipment and receiving a random access response including an uplink grant from an eNode B in response to the preamble transmission, wherein the random access configuration is determined by a group to which the user equipment belongs among a first random access configuration for a first user equipment group and a second random access configuration for a second user equipment group and wherein a resource reserved for the second user equipment group according to the second random access configuration is used to transmit the random access preamble or an uplink data.

According to a second technical solution of the present invention, a method of performing a random access, which is performed by an eNode B in a mobile communication system, includes the steps of receiving a random access preamble transmitted on a resource determined according to a random access configuration from a user equipment and transmitting a random access response including an uplink grant in response to the preamble transmission, wherein the random access configuration is determined by a group to which the user equipment belongs among a first random access configuration for a first user equipment group and a second random access configuration for a second user equipment group and wherein a resource reserved for the second user equipment group according to the second random access configuration is used to transmit the random access preamble or an uplink data.

According to a third technical solution of the present invention, a user equipment, which performs a random access in a mobile communication system, includes a transmission module and a processor, wherein the processor controls to transmit a random access preamble using a resource determined according to a random access configuration for the user equipment, wherein the random access configuration is determined by a group to which the user equipment belongs among a first random access configuration for a first user equipment group and a second random access configuration for a second user equipment group, wherein a resource reserved for the second user equipment group according to the second random access configuration is used to transmit the random access preamble or an uplink data.

According to a fourth technical solution of the present invention, an eNode B, which performs a random access in a mobile communication system, includes a transmission module and a processor, wherein the processor controls to transmit a random access response including an uplink grant in response to a random access preamble transmitted from a user equipment on a resource determined according to a random access configuration, wherein the random access configuration is determined by a group to which the user equipment belongs among a first random access configuration for a first user equipment group and a second random access configuration for a second user equipment group, wherein a resource reserved for the second user equipment group according to the second random access configuration is used to transmit the random access preamble or an uplink data.

The first to the fourth technical solution of the present invention can include all or a part of the following description.

The resource reserved for the second user equipment group according to the second random access configuration can be used to transmit the uplink data of a user equipment included in either the first user equipment group or the second user equipment group before an initiation of a random access procedure or after a completion.

The second user equipment group can include user equipments more than a preset number of user equipments simultaneously accessing the eNode B and the first user equipment group can include user equipments not belonging to the second user equipment group in a region of the eNode B.

The second user equipment group can include user equipments temporarily performing handover to the eNode B and the first user equipment group can include user equipments not belonging to the second user equipment group in a region of the eNode B.

A resource reserved for the first user equipment group according to the first random access configuration can be distinguished from a resource reserved for the second user equipment group according to the second random access configuration in at least one of a time domain or a frequency domain.

The random access response is transmitted on PDSCH (Physical Downlink Shared Channel) indicated by PDCCH (Physical Downlink Control Channel) and wherein time-frequency resource corresponding PDSCH for the first user equipment group is different from time-frequency resource corresponding to PDSCH for the second user equipment group.

The method includes the step of transmitting a message including identifier information of the user equipment on PUSCH (Physical Uplink Shared Channel) corresponding to the uplink grant, wherein time-frequency resource corresponding PUSCH for the first user equipment group is different from time-frequency resource corresponding PUSCH for the second user equipment group.

If user equipments included in the second user equipment group are included in a mobile relay node shortly before the user equipments try to access the eNode B, the user equipments included in the second user equipment group can initiate the random access according to a multicast handover command of the mobile relay node.

The multicast handover command includes an index of the user equipments included in the second user equipment group and the index may correspond to a resource determined according to the second random access configuration.

The user equipments included in the second user equipment group receives a multicast scheduling signal from the mobile relay node, the multicast scheduling signal includes an index of the user equipments contained in the second user equipment group, and the index may correspond to an uplink resource or a downlink resource for each of the user equipments.

The multicast handover message may be valid only for a preset time period.

Advantageous Effects

According to the present invention, a plurality of user equipments temporarily and simultaneously accessing an eNode B region can smoothly perform a random access procedure.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

FIG. 4 is a diagram for a structure of an uplink (UL) subframe;

FIG. 12 is a diagram for explaining a distinction of a user equipment group according to embodiment of the present invention;

BEST MODE MODE FOR INVENTION

Reference will now be made in detail to the preferred embodiments of the present invention, examples of which are illustrated in the accompanying drawings. Detail explanation disclosed in the following description together with the attached drawings is intended to explain exemplary embodiment of the present invention and it is not intended to indicate a unique embodiment by which the present invention is implemented. The following detailed description includes details to help the full understanding of the present invention. Yet, it is apparent to those skilled in the art that the present invention can be implemented without these details. For instance, although the following details are explained under an assumption that a mobile communication system corresponds to a system related to 3GPP, the present invention can be applied to a randomly different mobile communication system except a unique item of the system related to 3GPP LTE.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Moreover, in the following description, it is assumed that a terminal is a common name for such a mobile or a fixed user stage device as a user equipment (UE), a mobile station (MS), and the like. And, it is assumed that a base station is a common name for such a random node of a network stage communicating with a user equipment as a Node B, an eNode B, a base station, and the like.

Figure 1:
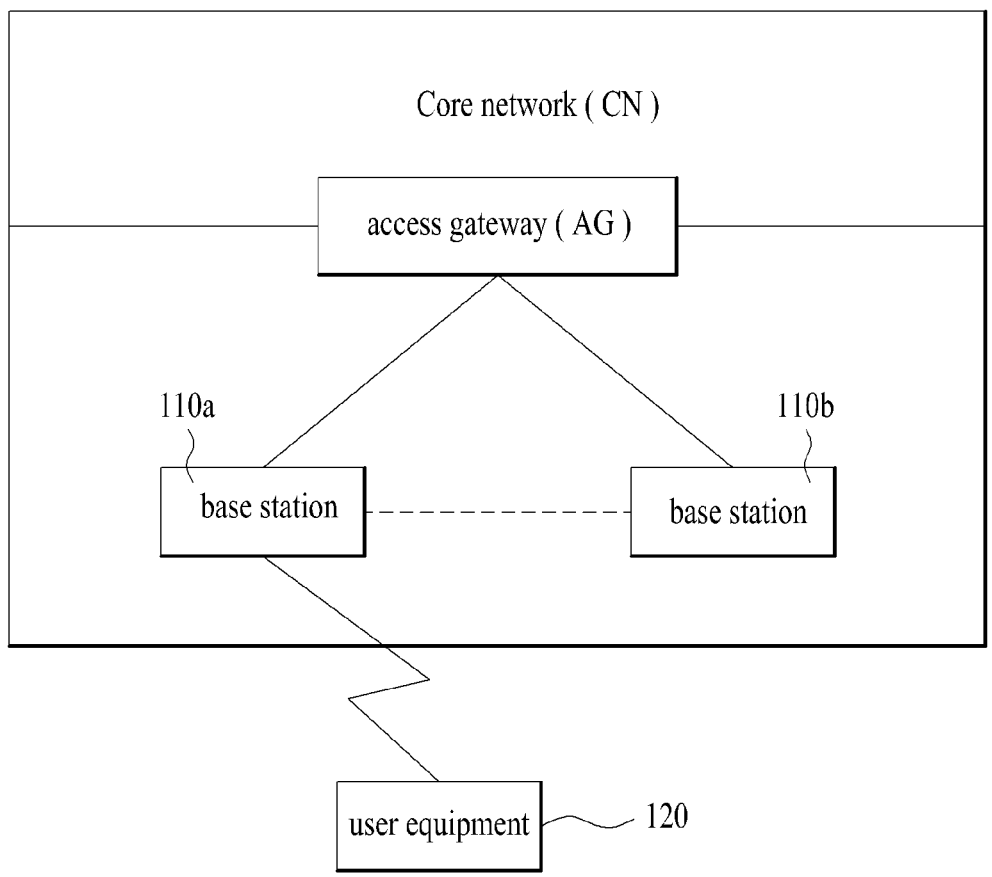
FIG. 1 is a diagram of a structure of LTE system.

Referring to FIG. 1, E-UMTS includes a user equipment (UE) 120, an eNode B (eNB) 110a/110b, and an access gateway (hereinafter abbreviated AG) connected to an external network in a manner of being situated at the end of a network (E-UTRAN). The eNode B may be able to simultaneously transmit multi data streams for a broadcast service, a multicast service and/or a unicast service. One eNode B contains at least one cell. The cell provides a downlink transmission service or an uplink transmission service to a plurality of user equipments by being set to one of 1.4 MHz, 3 MHz, 5 MHz, 10 MHz, 15 MHz, and 20 MHz of bandwidths. Different cells can be configured to provide corresponding bandwidths, respectively. An eNode B controls data transmissions/receptions to/from a plurality of the user equipments. For a downlink (hereinafter abbreviated DL) data, the eNode B informs a corresponding user equipment of time/frequency region on which data is transmitted, coding, data size, HARQ (hybrid automatic repeat and request) related information and the like by transmitting DL scheduling information. And, for an uplink (hereinafter abbreviated UL) data, the eNode B informs a corresponding user equipment of time/frequency region usable by the corresponding user equipment, coding, data size, HARQ-related information and the like by transmitting UL scheduling information to the corresponding user equipment. Interfaces for user-traffic transmission or control traffic transmission may be used between eNode Bs. A core network (CN) consists of an AG (access gateway) and a network node for user registration of a user equipment and the like. The AG manages a mobility of the user equipment by a unit of TA (tracking area) consisting of a plurality of cells.

Figure 2:
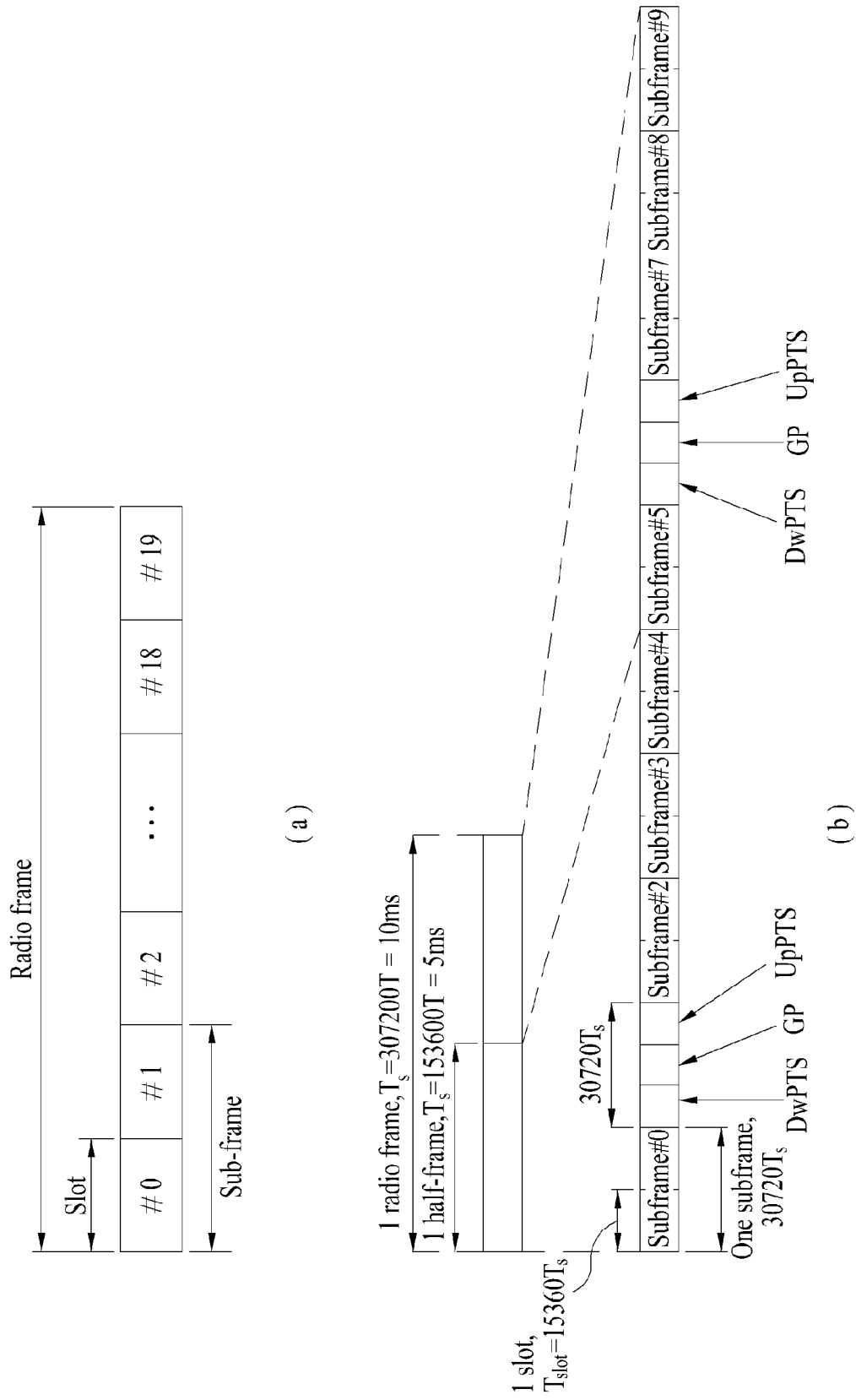
FIG. 2 is a diagram for a structure of a radio frame in LTE system.

FIG. 2 (a) is a diagram for a structure of a radio frame used in 3GPP LTE system. One radio frame includes 10 subframes. Each of the subframes includes 2 slots in time domain. And, a time taken to transmit one subframe is defined as a transmission time interval (hereinafter abbreviated TTI). For instance, one subframe may have a length of 1 ms and one slot may have a length of 0.5 ms. One slot may include a plurality of OFDM symbols in time domain. Since 3GPP LTE system uses OFDMA in downlink, OFDM symbol is provided to indicate one symbol period. The OFDM symbol may be named SC-FDMA symbol or symbol period in uplink. Resource block (RB) is a resource allocation unit and may include a plurality of contiguous subcarriers in one slot. The above-described structures of the radio frame are exemplary only. Hence, the number of subframes included in a radio frame, the number of slots included in the subframe and the number of OFDM symbols included in the slot may be modified in various ways.

FIG. 2 (b) is a diagram for a structure of a downlink radio frame of type 2. A type-2 radio frame includes 2 half frames. Each of the half frame includes 5 subframes, DwPTS (downlink pilot time slot), GP (guard period) and UpPTS (uplink pilot time slot). And, one of the subframes includes 2 slots. The DwPTS is used for initial cell search, synchronization or channel estimation in a user equipment. The UpPTS is used for channel estimation in a base station and uplink transmission synchronization of a user equipment. The guard period is a period for eliminating interference generated in uplink due to multi-path delay of a downlink signal between uplink and downlink.

In this case, the structures of the radio frame are exemplary only. And, the number of subframes included in a radio frame, the number of slots included in the subframe and the number of symbols included in the slot may be modified in various ways.

Figure 3:
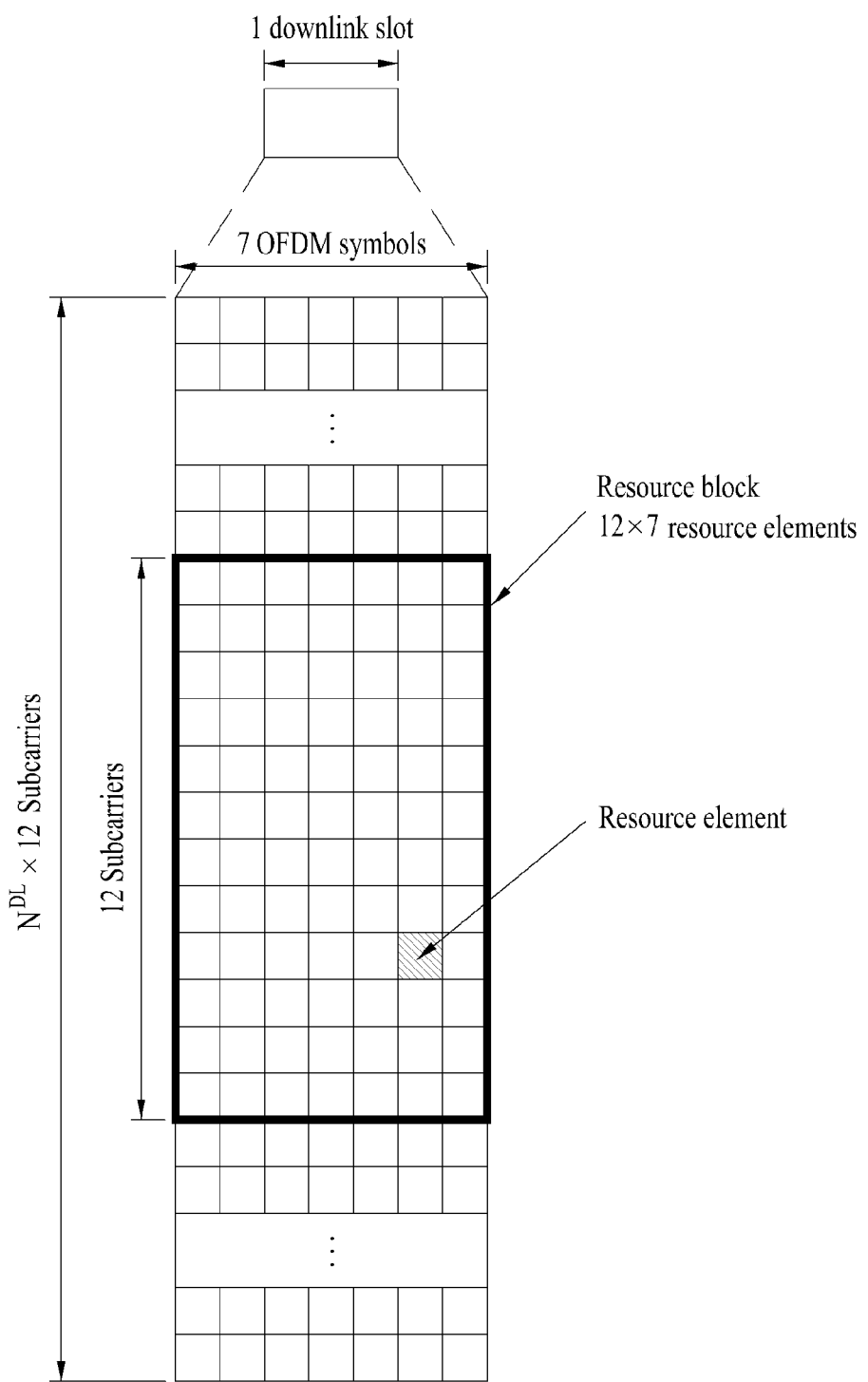
FIG. 3 is a diagram for one example of a resource grid for a downlink (DL) slot.

FIG. 3 is a diagram for one example of a resource grid for a downlink (DL) slot. Referring to FIG. 3, one downlink (DL) slot may include a plurality of OFDM symbols in time domain. In particular, one DL slot exemplarily includes 7 OFDM symbols and one resource block (RB) exemplarily includes 12 subcarriers in frequency domain, by which the present invention may be non-limited. For instance, in case of a normal CP (Cyclic Prefix), one slot includes 7 OFDM symbols. In case of an extended CP, one slot may include 6 OFDM symbols. Each element on a resource grid is called a resource element (hereinafter abbreviated RE). One resource block includes 12×7 resource elements. The number $N^{DL}$ of resource blocks included in a DL slot may depend on a DL transmission bandwidth. And, the structure of an uplink (UL) slot may be identical to that of the DL slot.

FIG. 4 is a diagram for a structure of an uplink (UL) subframe. Referring to FIG. 4, a UL subframe may be divided into a control region and a data region in frequency domain. A physical UL control channel (PUCCH), which includes UL control information, is allocated to the control region. And, a physical UL shared channel (PUSCH), which includes user data, is allocated to the data region. In order to maintain single carrier property, one user equipment does not transmit PUCCH and PUSCH simultaneously. PUCCH for one user equipment is allocated to a resource block pair (RB pair) in subframe. Resource blocks belonging to the resource block (RB) pair may occupy different subcarriers in each of 2 slots. Namely, a resource block pair allocated to PUCCH is frequency-hopped on a slot boundary.

Figure 5:
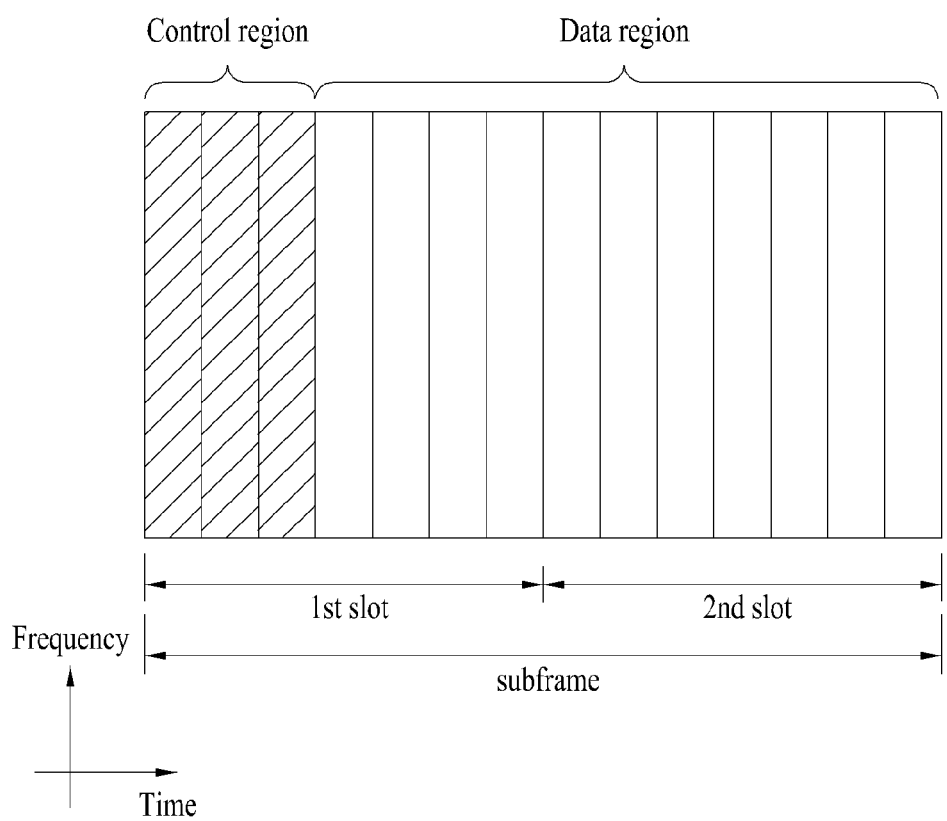
FIG. 5 is a diagram for a structure of a downlink (DL) subframe.

FIG. 5 is a diagram for a structure of a downlink (DL) subframe. Maximum 4 OFDM symbols situated in a head part of a first slot of one subframe correspond to a control region to which control channels are allocated. The rest of OFDM symbols correspond to a data region to which PDSCH (physical downlink shared channel) is allocated. Examples of DL control channels used by 3GPP LTE may include PCFICH (Physical Control Format Indicator Channel), PDCCH (Physical Downlink Control Channel), PHICH (Physical hybrid automatic repeat request indicator Channel) and the like.

The PCFICH is transmitted in a first OFDM symbol of a subframe and includes information on the number of OFDM symbols used for a transmission of a control channel within the subframe. The PHICH is a response channel in response to UL transmission and includes a HARQ ACK/NACK signal. The PDCCH includes UL or DL scheduling information and power control information.

Figure 6:
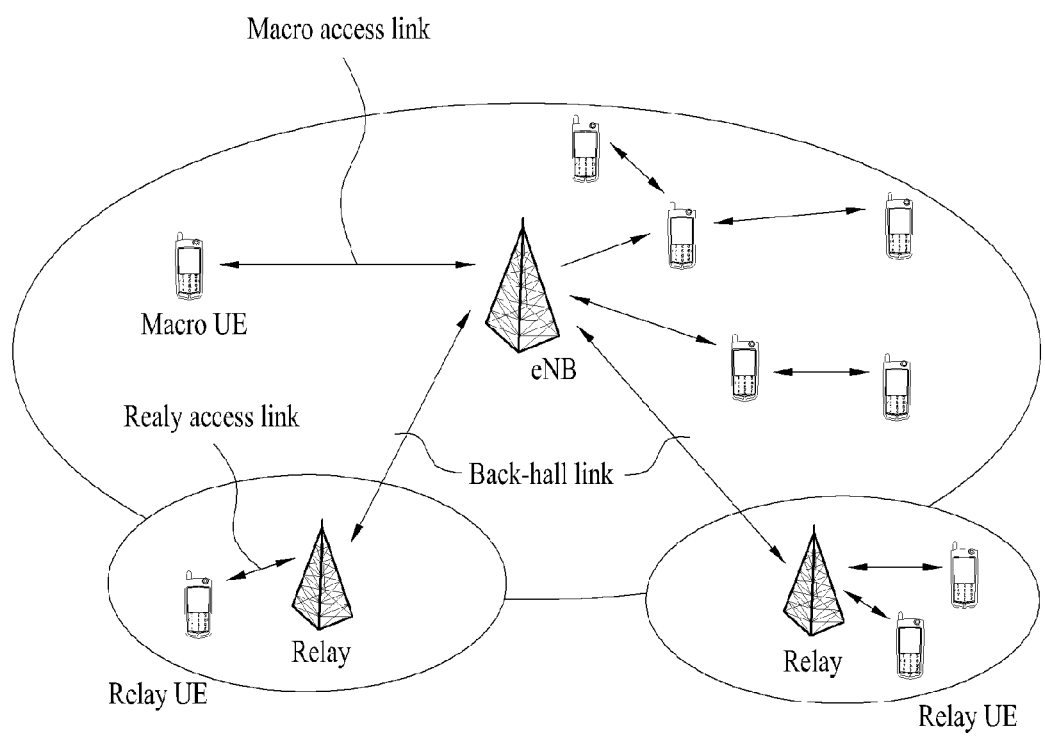
FIG. 6 is a diagram of a wireless communication system including a relay.

FIG. 6 is a diagram of a wireless communication system including a relay. A relay expands service coverage of an eNode B or makes a service smoothly provided in a manner of being installed in a radio shadow area.

Referring to FIG. 6, a wireless communication system includes an eNode B, a relay, and a user equipment. The user equipment performs a communication with the eNode B or the relay. The user equipment performing a communication with the eNode B is called a macro UE and the user equipment performing a communication with the relay is called a relay UE. A communication link between the eNode B and the macro UE is called a macro access link and the communication link between the relay and the relay UE is called a relay access link. And, the communication link between the eNode B and the relay is called a backhaul link.

The relay can be classified into an L1 (layer 1) relay, an L2 (layer 2) relay, and an L3 (layer 3) relay according to how much function is performed by the relay in a multi hop transmission. And, the relay can be classified into an in-band connection where a network-relay link and a network-UE link shares an identical frequency band in a donor cell and an out-band connection where the network-relay link and the network-UE link use a frequency band different from each other in a donor cell according to a network link. And, the relay can be classified into a transparent relay of which the UE is not aware that the UE is communicating via the relay and a non-transparent relay of which the UE is aware that the UE is communicating via the relay. In terms of mobility, the relay can be divided into a fixed relay capable of being used for a radio shadow area and a cell coverage increase, a nomadic relay capable of being temporarily installed or capable of being randomly moved when users are suddenly increased, and a mobile relay capable of being installed in such a public transportation as a bus, a train, and the like.

Figure 7:
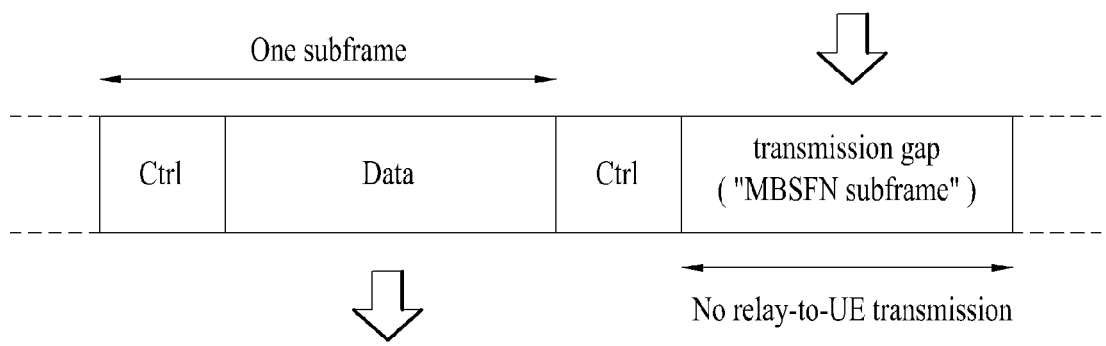
FIG. 7 is a diagram of an example of performing a backhaul transmission using a MBSFN subframe.

FIG. 7 is a diagram of an example of performing a backhaul transmission using a MBSFN subframe. In an in-band relay mode, the eNode B-relay link (i.e., the backhaul link) operates in a frequency band identical to the relay-UE link (i.e., the relay access link). In case that the relay transmits a signal to the UE while receiving a signal from the eNode B, or an inverse case, since a transmitter and a receiver of the relay cause interference from each other, it may be restricted for the relay to transmit and receive at the same time. To this end, the backhaul link and the relay access link are partitioned by a TDM scheme. LTE-A sets the backhaul link in a MBSFN subframe to support measuring operation of a legacy LTE UE existing in a relay zone (fake MBSFN method). In case that a random subframe is signaled as a MBSFN subframe, since the UE receives a control region of the corresponding subframe only, the relay can configure the backhaul link using a data region of the corresponding subframe.

Meanwhile, in the following description, a random access procedure performed in LTE system is explained in detail.

In LTE system, a user equipment may be able to perform a random access procedure in one of the following cases.

The user equipment performs an initial access without a connection (e.g., RRC connection) with an eNode B.

The user equipment initially accesses a target cell in a handover procedure.

The random access procedure is requested by a command from an eNode B.

In a situation that time synchronization of uplink is not matched or that a designated radio resource used to request a radio resource is not allocated, data in uplink is generated.

A recovery procedure is performed in case of radio link failure or handover failure.

Based on the aforementioned contents, a general contention-based random access procedure is explained in the following description.

Figure 8:
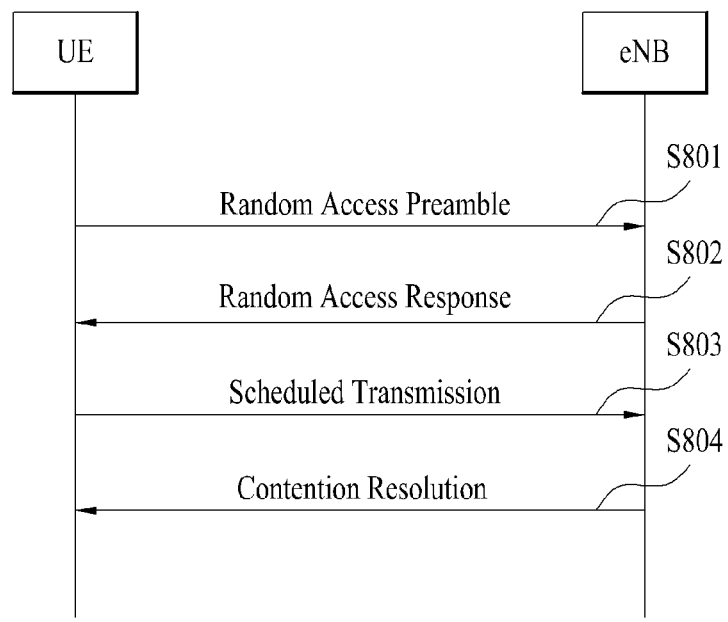
FIG. 8 is a diagram of a contention-based random access procedure.

FIG. 8 is a diagram for describing an operating process between a user equipment and an eNode B in a contention based random access procedure.

(1) $1^{st}$ Message Transmission

First of all, a user equipment randomly selects a random access preamble from a set of random access preambles indicated by system information or a handover command, selects a PRACH (physical RACH) resource for carrying the random access preamble, and then transmits the random access preamble via the selected PRACH resource [S801].

(2) $2^{nd}$ Message Reception

After the user equipment has transmitted the random access preamble in the step S801, the user equipment attempts a reception of its random access response in a random access response receiving window indicated by an eNode B through the system information or the handover command [S802]. In particular, the random access response information may be transmitted in format of MAC PDU. And, the MAC PDU may be carried on PDSCH (physical downlink shared channel). In order to receive the information carried on the PDSCH, the user equipment preferably monitors PDCCH (physical downlink control channel). In particular, information on a user equipment necessary to receive the PDSCH, a frequency and time information of a radio resource of the PDSCH, a transmission format of the PDSCH and the like may be preferably included in the PDCCH. Once the user equipment succeeds in the reception of the PDCCH transmitted to the user equipment, it may be able to appropriately receive a random access response carried on the PDSCH in accordance with the informations of the PDCCH. And, a random access preamble identifier (ID) (e.g., RAPID (random access preamble identifier), a UL grant indicating a UL radio resource, a temporary cell identifier (temporary C-RNTI), time synchronization correction value (timing advance command (TAC)) and the like can be included in the random access response.

As mentioned in the foregoing description, the random access preamble identifier is required for the random access response. Since random access response information for at least one or more user equipments may be included in one random access preamble, it may be necessary to indicate the UL grant, the temporary cell identifier and the TAC are valid for which user equipment. In this step, assume that the user equipment selects a random access preamble identifier matching the random access preamble selected by the user equipment in the step S802. Through this, the user equipment may be able to receive a UL grant, a temporary cell identifier 9temporary C-RNTI), time synchronization correction value (timing advance command: TAC) and the like.

(3) $3^{rd}$ Message Transmission

If the user equipment receives the random access response valid for the user equipment, it may process the informations included in the random access response. In particular, the user equipment applies the TAC and saves the temporary cell identifier. Moreover, the user equipment may be able to save data, which is to be transmitted in response to the valid random access response, in a message-3 buffer.

Meanwhile, using the received UL grant, the user equipment transmits data (i.e., a $3^{rd}$ message) to the eNode B [S803]. In the contention based random access procedure, an eNode B is unable to determine which user equipments perform the random access procedure. In order for resolve the contention later, the eNode B needs to identify a user equipment.

As a method of including an identifier of a user equipment, two kinds of methods have been discussed. According to a $1^{st}$ method, if a user equipment has a valid cell identifier already allocated by a corresponding cell prior to the random access procedure, the user equipment transmits its cell identifier via UL transmission signal corresponding to the UL grant. On the contrary, if the user equipment fails to receive the allocation of a valid cell identifier prior to the random access procedure, the user equipment transmits its unique identifier (e.g., S-TMSI, random ID (Random Id), etc.). In general, the unique identifier is longer than the cell identifier. If the user equipment transmits data corresponding to the UL grant, the user equipment initiates a contention resolution timer (hereinafter abbreviated CR timer).

(4) $4^{th}$ Message Reception

After the user equipment has transmitted the data including its identifier via the UL grant included in the random access response, the user equipment waits for an instruction from the eNode B for the contention resolution. In particular, the user equipment may attempt a reception of PDCCH to receive a specific message [S804]. As a method of receiving the PDCCH, two kinds of methods have been discussed. As mentioned in the foregoing description, if the $3^{rd}$ message transmitted in response to the UL grant uses a cell identifier as its identifier, the user equipment attempts a reception of PDCCH using its cell identifier. If the identifier is a unique identifier, the user equipment may be able to attempt a reception of PDCCH using a temporary cell identifier included in the random access response. Thereafter, in the former case, if the PDCCH is received via its cell identifier before expiration of the contention resolution timer, the user equipment determines that the random access procedure is normally performed and then ends the random access procedure. In the latter case, if PDCCH is received via a temporary cell identifier before expiration of the contention resolution timer, the user equipment checks data carried on PDSCH indicated by the PDCCH. If the unique identifier of the user equipment is included in a content of the data, the user equipment determines that the random access procedure is normally performed and then ends the random access procedure.

Meanwhile, in an operation of a non-contention based random access procedure, unlike the contention based random access procedure shown in FIG. 8, a random access procedure is ended with a $1^{st}$ message transmission and a $2^{nd}$ message transmission only. Yet, before a user equipment transmits a random access preamble as a $1^{st}$ message to an eNode B, the user equipment receives assignment of the random access preamble from the e Node B, transmits the assigned random access preamble as the $1^{st}$ message to the eNode B, and then receives a random access response from the eNode B, whereby the random access procedure is ended.

Figure 9:
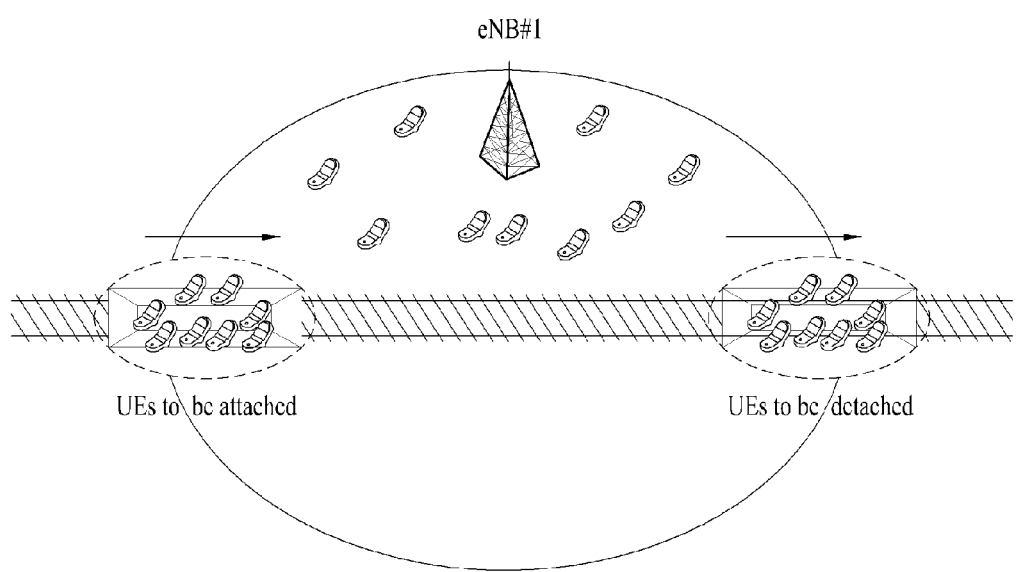
FIG. 9 is a diagram of an example of a plurality of user equipments attempting to simultaneously access an eNode B region.

The aforementioned random access procedure may be degraded in efficiency if a plurality of user equipments attempts a connection establishment or a connection cancellation at a time. For instance, as depicted in FIG. 9, a plurality of the user equipments may approach a specific eNode B via a bus, a train, or an airplane. In this case, if the user equipments belonging to the bus, the train, or the airplane almost simultaneously start to perform the random access procedure for a handover or an initial access in a state that there is no connection with an eNode B (e.g., a case of user equipments, which are power-off in the airplane, simultaneously turning the power on, etc.), it may occur a case that an accessing an eNode B is delayed or unavailable. In the following description, a method of smoothly performing the random access procedure in the aforementioned situation is described.

Figure 10:
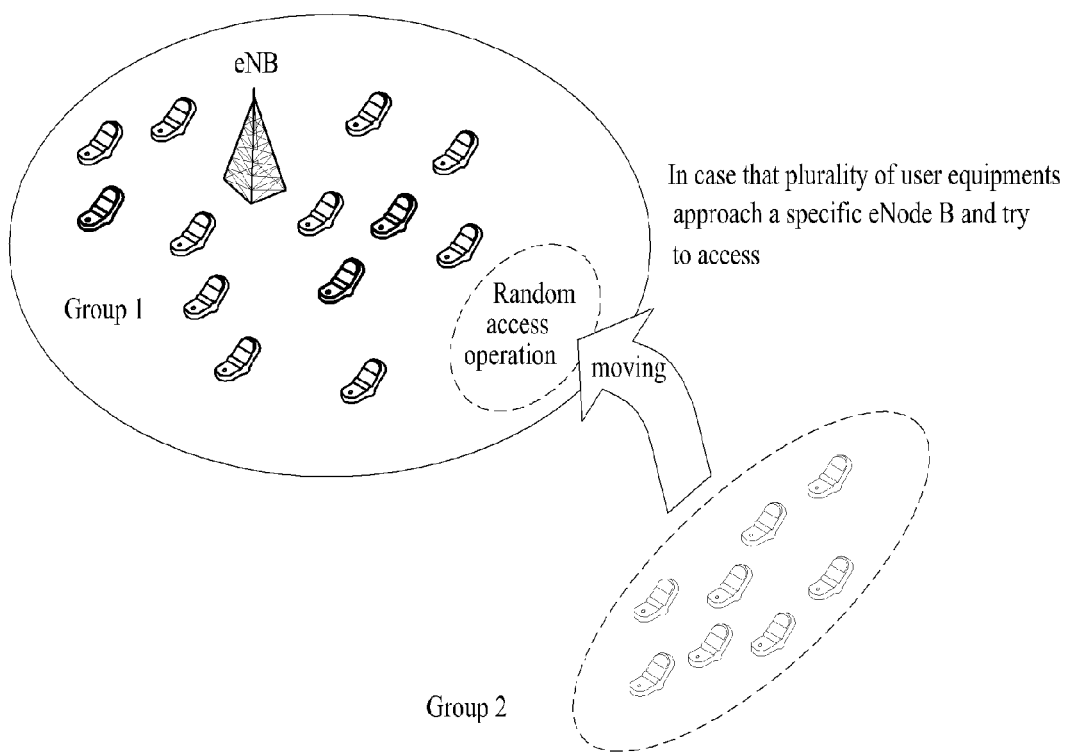
FIG. 10 is a diagram of a user equipment group according to embodiment of the present invention.

FIG. 10 depicts a configuration for user equipments situated in a specific eNode B region as a group 1 and a configuration for user equipments almost simultaneously starting a random access procedure for the specific eNode B by the bus, the train, or the airplane as a group 2. After grouping the user equipments existing in the eNode B region, it is able for the user equipments belonging to the group 1 and the user equipments belonging to the group 2 to use a resource different from each other. In particular, a resource for transmitting a first message in the random access procedure can be configured with a region different from each other in time or frequency domain (refer to FIG. 11(a)). Similarly, time or frequency resource for PUSCH and PDSCH can be configured with a region different from each other in time or frequency domain for the group 1 and the group 2 (refer to FIG. 11 (b)).

Specifically, a case of transmitting the first message in the random access procedure is explained as an example. The first message including a random access preamble in the random access procedure is transmitted via a PRACH resource indicated by a random access configuration. In general, the PRACH resource consists of 6 resource blocks (RB) and a subcarrier spacing of the PRACH resource is different from that of the PUSCH resource. And, the PRACH resource is reserved for the transmission of the first message of the random access procedure. Mostly, the PRACH resource is not used for transmission of an uplink data. In case of FDD, the random access configuration applicable to the present invention corresponds to the following Table 1.

TABLE 1

| PRACH/PUSCH/PDSCH Configuration Index | Preamble Format | System frame number | Subframe number |
|---|---|---|---|
| 0 | 0 | Even | 1 |
| 1 | 0 | Even | 4 |
| 2 | 0 | Even | 7 |
| 3 | 0 | Any | 1 |
| 4 | 0 | Any | 4 |
| 5 | 0 | Any | 7 |
| 6 | 0 | Any | 1, 6 |
| 7 | 0 | Any | 2, 7 |
| 8 | 0 | Any | 3, 8 |
| 9 | 0 | Any | 1, 4, 7 |
| 10 | 0 | Any | 2, 5, 8 |
| 11 | 0 | Any | 3, 6, 9 |
| 12 | 0 | Any | 0, 2, 4, 6, 8 |
| 13 | 0 | Any | 1, 3, 5, 7, 9 |
| 14 | 0 | Any | 0, 1, 2, 3, 4, 5, 6, 7, 8, 9 |
| 15 | 0 | Even | 9 |
| 16 | 1 | Even | 1 |
| 17 | 1 | Even | 4 |
| 18 | 1 | Even | 7 |
| 19 | 1 | Any | 1 |
| 20 | 1 | Any | 4 |
| 21 | 1 | Any | 7 |
| 22 | 1 | Any | 1, 6 |
| 23 | 1 | Any | 2, 7 |
| 24 | 1 | Any | 3, 8 |
| 25 | 1 | Any | 1, 4, 7 |
| 26 | 1 | Any | 2, 5, 8 |
| 27 | 1 | Any | 3, 6, 9 |
| 28 | 1 | Any | 0, 2, 4, 6, 8 |
| 29 | 1 | Any | 1, 3, 5, 7, 9 |
| 30 | N/A | N/A | N/A |
| 31 | 1 | Even | 9 |
| 32 | 2 | Even | 1 |
| 33 | 2 | Even | 4 |
| 34 | 2 | Even | 7 |
| 35 | 2 | Any | 1 |
| 36 | 2 | Any | 4 |
| 37 | 2 | Any | 7 |
| 38 | 2 | Any | 1, 6 |
| 39 | 2 | Any | 2, 7 |
| 40 | 2 | Any | 3, 8 |
| 41 | 2 | Any | 1, 4, 7 |
| 42 | 2 | Any | 2, 5, 8 |
| 43 | 2 | Any | 3, 6, 9 |
| 44 | 2 | Any | 0, 2, 4, 6, 8 |
| 45 | 2 | Any | 1, 3, 5, 7, 9 |
| 46 | N/A | N/A | N/A |
| 47 | 2 | Even | 9 |
| 48 | 3 | Even | 1 |
| 49 | 3 | Even | 4 |
| 50 | 3 | Even | 7 |
| 51 | 3 | Any | 1 |
| 52 | 3 | Any | 4 |
| 53 | 3 | Any | 7 |
| 54 | 3 | Any | 1, 6 |
| 55 | 3 | Any | 2, 7 |
| 56 | 3 | Any | 3, 8 |
| 57 | 3 | Any | 1, 4, 7 |
| 58 | 3 | Any | 2, 5, 8 |
| 59 | 3 | Any | 3, 6, 9 |
| 60 | N/A | N/A | N/A |
| 61 | N/A | N/A | N/A |
| 62 | N/A | N/A | N/A |
| 63 | 3 | Even | 9 |

In Table 1, PRACH configuration index 0 is usable in a preamble format 0 and means that a random access preamble is transmitted in a frame where a system frame number is an even number via a first subframe.

For the PRACH configuration indexes listed in Table 1, each of the group 1 and the group 2 can be configured to use an index different from each other. Or, after dividing the PRACH configuration indexes of Table 1 into two sets, each of the divided sets can be allocated to each group. For instance, the PRACH configuration indexes having an even system frame number (0-2, 15-18, 31-34, 47-50, 63) can be allocated to the group 1 and the rest of the PRACH configuration indexes can be allocated to the group 2. In this case, the set of the PRACH configuration indexes allocated to the group 2 may not be used if the user equipments belonging to the group 2 do not exist within the eNode B region. In this case, the PRACH configuration indexes of Table 1 may be used after an appropriate modification is added.

Or, after adding new indexes to the PRACH configuration indexes of Table 1, it is able to allocate the PRACH configuration indexes of Table 1 to the group 1 and the newly added PRACH configuration indexes can be allocated to the group 2. In this case, it is preferable to configure the newly added PRACH configuration indexes to distinguish the resource regions by which the user equipments of the group 1 and the user equipments of the group 2 use, respectively. For instance, the group 1 can be configured to transmit a preamble in an even number subframe only and the group 2 can be configured to attempt to access in an odd number subframe (or system frame) only.

As mentioned in the foregoing description, the PRACH configuration indexes can be divided into the index for the group 1 and the index for the group 2. It is preferable to configure the time-frequency resource designated by the PRACH configuration index for the group 2 to be utilized as a PUSCH resource before an initiation of the random access procedure of the UEs included in the group 2 or after a completion of the random access procedure of the UEs included in the group 2. As mentioned earlier, the PRACH resource designated by the PRACH configuration index is not scheduled for an uplink data transmission in general since a random access preamble transmission may randomly occurs. Because the resource for the group 2, i.e., the resource designated by the PRACH configuration indexes for the group 2 may be inefficient to be continuously left out as the PRACH resource due to the property of the group 2 (e.g., the group 2 is a set of user equipments situated in a specific train and the train is temporarily stopped in the eNode B region, etc.).

Figure 11:
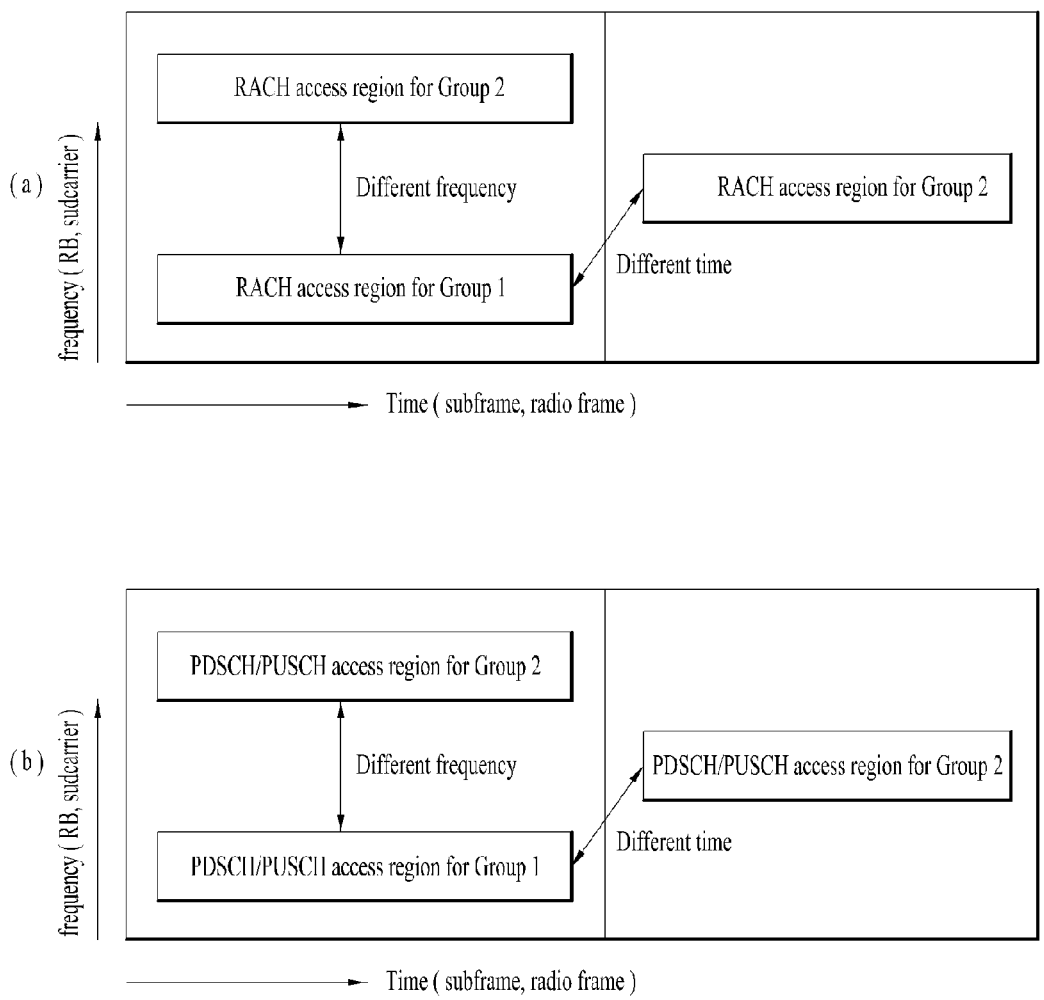
FIG. 11 is a diagram of a time-frequency resource region according to a user equipment group according to embodiment of the present invention.

And, in case that the PRACH configuration for the group 1 and the group 2 designates an identical subframe, the resource designated by the PRACH configuration for the group 1 and the resource designated by the PRACH configuration for the group 2 can be configured by a region different from each other on a frequency axis or a time axis as depicted in FIG. 11 (*a*). In this case, the resource designated by the PRACH configuration for the group 2 can be configured to be utilized as the PUSCH resource if the user equipments belonging to the group 2 do not exist within the eNode B region. Yet, if a transmission of a random access preamble is multiplexed on the frequency axis, processing peak of the eNode B may increase.

Meanwhile, as mentioned earlier, if a resource for PRACH, PUSCH, PDSCH, and the like is separately allocated for the group 2, an eNode B is needed to distinguish the group to which the UE belongs. Hence, methods for distinguishing the group to which the UE belongs are explained in the following description.

As a first method, if the number of UEs (FIG. 12 (*a*)) transmitting a random access preamble to an eNode B is greater than a threshold number, the eNode B can judge that the UEs belong to the group 2. In case of the present method, if the threshold number is set too low, since the resource for the group 2 can be allocated to the UEs belonging to the group 1, it is necessary to appropriately configure the threshold number in consideration of the number of UEs simultaneously transmitting the random access preamble in a general situation.

As a second method, in case that a UE randomly accesses an eNode B, the UE promises a method of informing that the UE belongs to the group 2 to the eNode B in advance and there may exist a method of transmitting a random access preamble according to the promised method. In this case, the promise may include specific indication information, a preamble sequence, transmission to a specific resource region, and the like. For instance, in case of the preamble sequence, 64 random access preambles randomly selected by the UE can be divided into a preamble set 1, a preamble set 2, and preambles of a non-contention access use. In general, the UE transmits a prescribed one random access preamble in a manner of randomly selecting among the 64 random access preambles. In this case, it is able to promise in advance that the UEs belonging to the group 1 transmit the preamble belonging to the preamble set 1 and the UEs belonging to the group 2 transmit the preamble belonging to the preamble set 2. Or, it may be able to use a method of adding a preamble set 3 for the group 2 to the conventional 64 preambles. In case of using the method promised in advance and informs that the UE is belonging to the group 2, a transmission of a promised preamble can be implemented via an emergency access trial button (or a user interface) and the like in the UE device.

As a third method, it is able to inform the eNode B that the UEs are belonging to the group 2 by the bus, the train, the airplane, or the like to which the UE belongs. Yet, to this end, if a user of the UE gets on one of the transportations, it is necessary for the corresponding UE to register to an authentication registering device installed in the transportation. In order to transmit a signal for registering to the authentication registering device, Bluetooth, RF (radio frequency) transmission, LTE/LTE-A and the like can be used.

As a fourth method, as depicted in FIG. 12 (*b*), if a mobile relay node 1401 is installed in the transportation such as the bus, the train, the airplane, or the like, the mobile relay node 1401 can notify the eNode B 1411 of the information on the number of UEs accessed to the mobile relay node, anticipated arrival time, and the like via a backhaul, and the like. The information notified to the eNode B 1411 from the mobile relay node 1401 may include necessary informations for the UEs intended to make a handover to the eNode B to access the eNode B without a contention besides the exemplified information on the number of UEs and the like.

The eNode B can know which group is the group to which the UE is included among the group 1 and the group 2 by one of the aforementioned methods and it is able to make the user equipments belonging to the group 2 transmit a random access preamble, an uplink data, and the like via a separately allocated resource. For instance, in case of a handover command, the PRACH configuration index for the group 2 is informed to a specific UE belonging to the group 2 and the UE can transmit a random access preamble using a time-frequency resource indicated by the corresponding PRACH configuration index. Yet, as depicted in FIG. 12 (*b*), to transmit a handover message to each of the UEs included in the transportation in which the mobile relay node is installed may have a significant signal overhead. Hence, in the following description, a method of transmitting a handover message using one Medium Access Control (MAC) broadcast/multicast signal is described.

Figure 13:
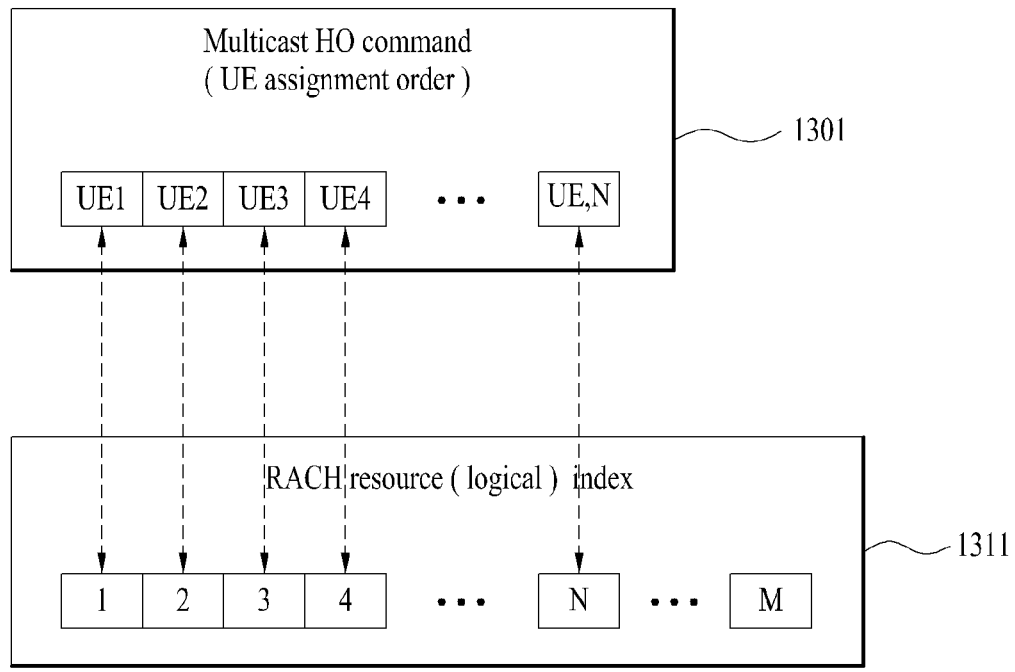
FIG. 13 is a diagram of a broadcast/multicast handover message according to embodiment of the present invention.

FIG. 13 is a diagram of a broadcast/multicast handover message according to embodiment of the present invention. Referring to FIG. 13, a broadcast/multicast handover message 1301 may include an identifier (e.g., C-RNTI, etc.) of the UEs (the number of UEs=N) corresponding to the group 2 of which accessed the mobile relay node. And, the identifier may correspond to the PRACH configuration index (1, . . . , M, M>=N) for the group 2. For instance, a specific UE 1 belonging to the group 2 receives a multicast handover message 1301 from the mobile relay node and may be then able to transmit a random access preamble with a time-frequency resource indicated by a PRACH configuration index 1, which is related to an identifier (UE1) of the specific UE 1. In this case, the PRACH configuration index related to the multicast handover message 1301 may correspond to a logical index. In this case, this may correspond to the aforementioned PRACH configuration index for the group 2. In particular, the PRACH configuration index related to the multicast handover message may sequentially correspond to the aforementioned PRACH configuration index for the group 2 (0-2, 15-18, 31-34, 47-50, 63), in this case, M may correspond to 16.

Coordination is necessary between the eNode B and the mobile relay node for the multicast/broadcast handover message. In particular, the mobile relay node informs the eNode B of the number of UEs (UE, N) accessed the mobile relay node, and the like and the eNode B can determine the PRACH configuration index for the group 2 based on the information provided by the mobile relay node.

And, the obtained resource (the resource corresponding to the PRACH configuration index) can be configured to be temporarily valid. To this end, a timer can be applied. In particular, the resource indicated by the broadcast/multicast handover message 1301 is valid only for the time period designated by the timer. After the mobile relay node has transmitted the broadcast/multicast handover message 1301, if the time period designated in the timer elapses, the designated resources can be configured not to be valid. In this case, the UEs belonging to the mobile relay node can transmit the random access preamble using the resource for the group 1.

If the mobile relay node is installed in a train and an eNode B is located at a region where the train is temporarily stopped, the UEs, which have performed a handover from the mobile relay node to the eNode B, need to perform a handover to the mobile relay node again. In this case, the aforementioned broadcast/multicast handover message 1301 can be applied as well.

Figure 14:
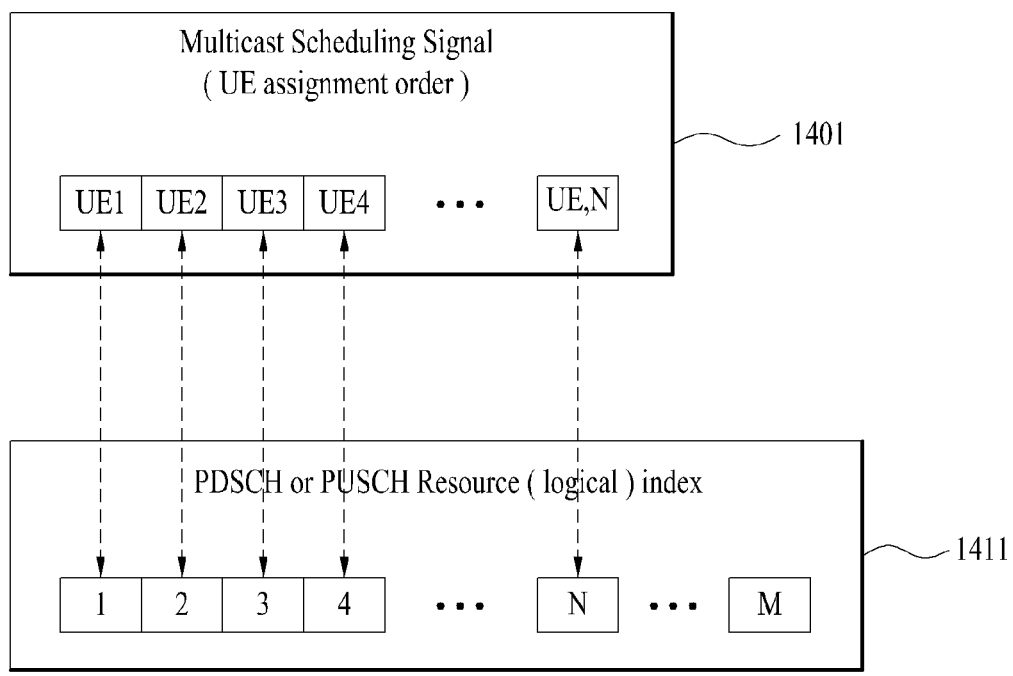
FIG. 14 is a diagram of a broadcast/multicast scheduling signal according to embodiment of the present invention.

Meanwhile, the UEs belonging to the group 2 can receive time-frequency resource for PUSCH and PDSCH via a broadcast/multicast signaling depicted in FIG. 14 as well as the resource for the random access preamble. In FIG. 14, PDSCH or PUSCH resource index related to the identifiers of the UEs may be a logical index corresponding to a part of the PDSCH, PUSCH configuration index in Table 1. Since the composition and the explanation for the broadcast/multicast scheduling signal is similar to the explanation aforementioned in FIG. 13, detail explanation is omitted.

Figure 15:
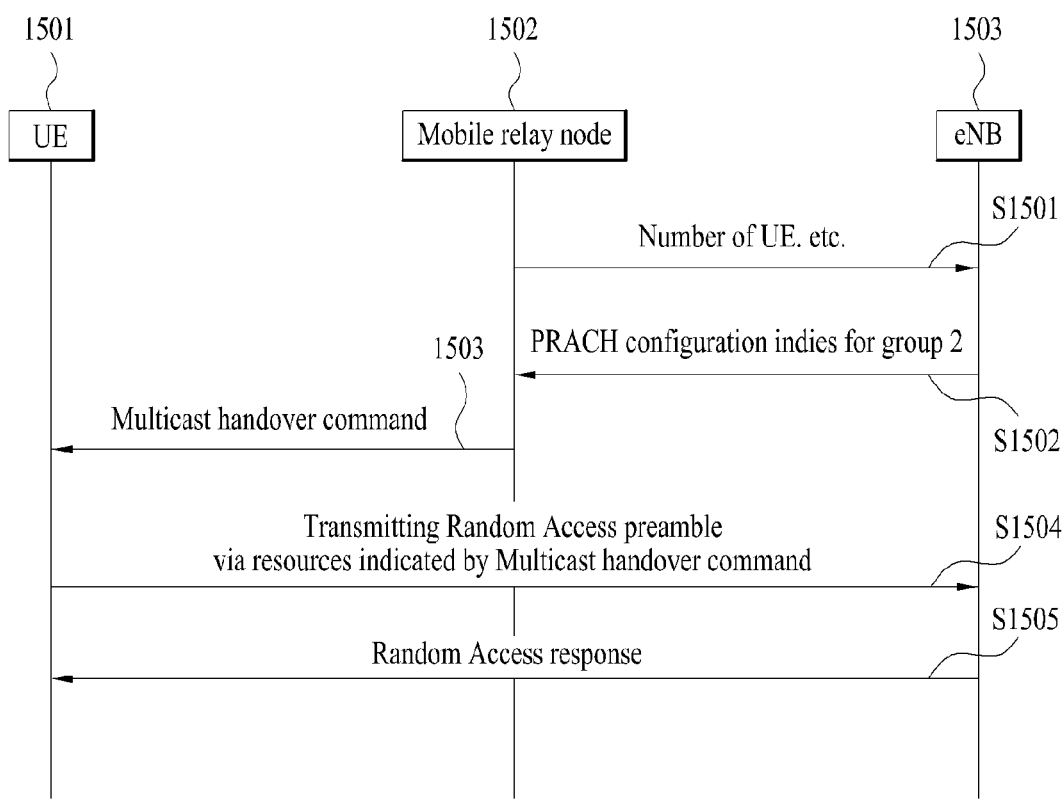
FIG. 15 is a flowchart for a handover process of a user equipment belonging to a mobile relay node according to embodiment of the present invention.

FIG. 15 is a flowchart for a handover process of a user equipment 1501 belonging to a mobile relay node 1502. If the mobile relay node 1502 of which the user equipment 1501 has accessed approaches an eNode B 1503, the mobile relay node 1502 transmits information on the number of user equipment 1501 accessed the mobile relay node, and the like to the eNode B 1503 via a backhaul link, and the like [S1501]. The eNode B 1503 determines PRACH configuration indexes for the user equipments 1501, which have accessed the mobile relay node 1502, based on the information and transmits the PRACH configuration indexes to the mobile relay node 1502 via MBSFN subframe, and the like [S1502]. After generating a multicast handover command based on the PRACH configuration indexes from the eNode B 1503, the mobile relay node 1502 transmits the multicast handover command to the UE 1501 [S1503]. The UE 1501 transmits a random access preamble via a resource indicated by the PRACH configuration index, which is related to the identifier of the UE in the multicast handover command [S1504]. The eNode B 1503 transmits a random access response including an UL grant, time synchronization correction value, and the like in response to the random access preamble [S1505]. In this case, the aforementioned contents can be applied to each of the steps.

Figure 16:
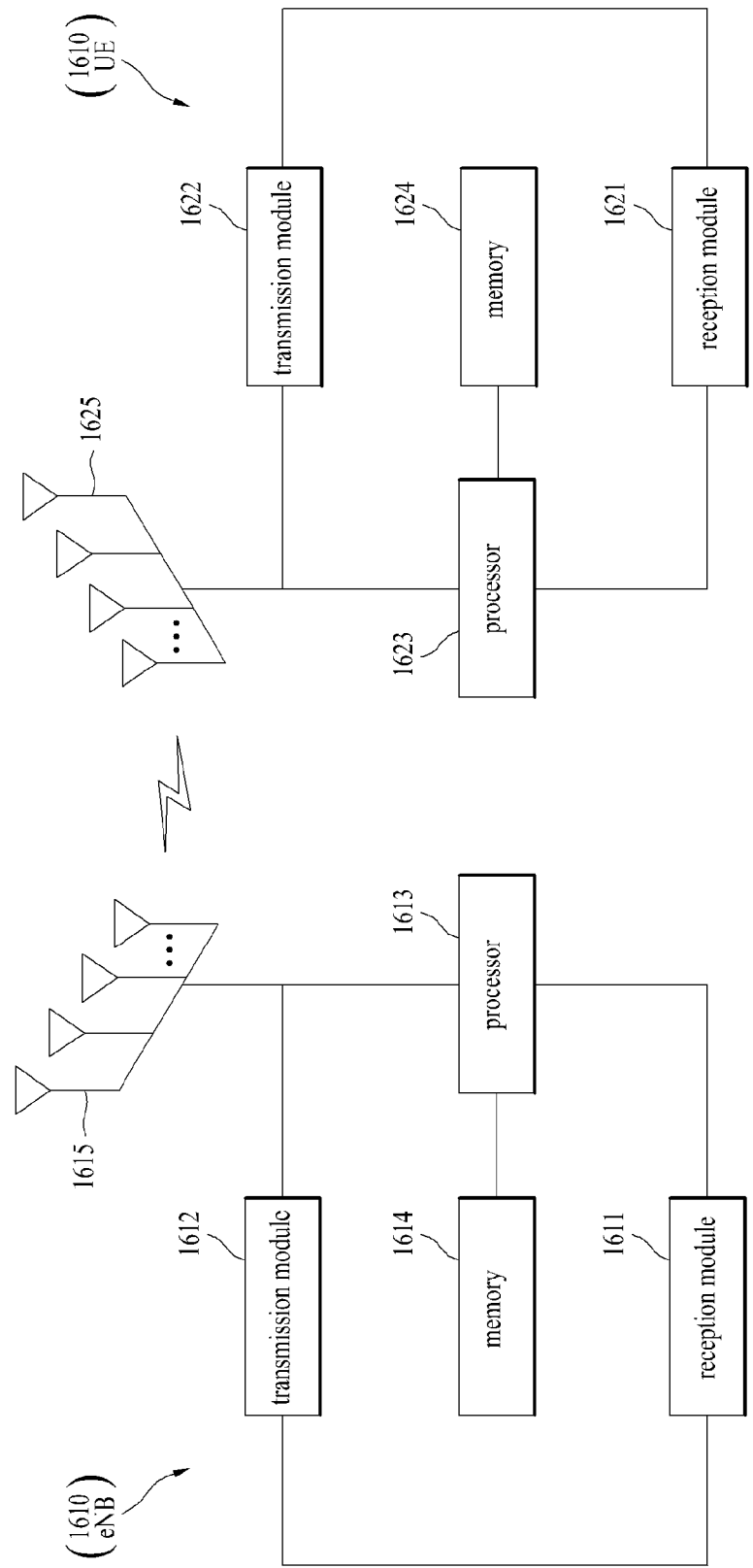
FIG. 16 is a diagram of a configuration of an eNode B device and a user equipment device according to embodiment of the present invention.

FIG. 16 is a diagram of a configuration of an eNode B device and a user equipment device according to embodiment of the present invention.

Referring to FIG. 16, the eNode B 1610 according to the present invention includes a reception module 1611, a transmission module 1612, a processor 1613, a memory 1614, and a plurality of antennas 1615. A plurality of the antennas 1615 means the eNode B capable of supporting MIMO transmission and reception. The reception module 1611 can receive various signals, a data, and information in UL from the UE. The transmission module 1612 can transmit various signals, a data, and information in DL to the UE. The processor 1613 can control overall operations of the eNode B 1610.

The eNode B 1610 according to one embodiment of the present invention can be configured to transmit control information on UL multi antenna transmission. The processor 1613 of the eNode B controls to transmit a random access response including UL grant information in response to a random access preamble, which is transmitted via a resource determined according to a random access configuration from the UE. The random access configuration is determined by a group to which the UE belongs among a first random access configuration for a first UE group and a second random access configuration for a second UE group. A resource reserved for the second UE group according to the second random access configuration can be used to transmit the random access preamble or an UL data.

Besides, the processor 1613 of the eNode B 1610 is configured perform a function of processing information received by the eNode B 1610, information to be transmitted to an external, and the like. The memory 1614 is configured to store the processed information for a prescribed time and can be substituted by such a configuring element as a buffer (not depicted), or the like.

Subsequently, referring to FIG. 16, the UE 1620 according to the present invention includes a reception module 1621, a transmission module 1622, a processor 1623, a memory 1624, and a plurality of antennas 1625. A plurality of the antennas 1625 means the UE capable of supporting MIMO transmission and reception. The reception module 1621 can receive various signals, a data, and information in DL from the eNode B. The transmission module 1622 can transmit various signals, a data, and information in UL to the eNode B. The processor 1623 can control overall operations of the UE 1620.

The UE 1620 according to one embodiment of the present invention can be configured to perform UL multi antenna transmission. The processor 1623 of the UE controls to transmit a random access preamble using a resource determined according to a random access configuration for the UE. The random access configuration is determined by a group to which the UE belongs among a first random access configuration for a first UE group and a second random access configuration for a second UE group. A resource reserved for the second UE group according to the second random access configuration can be used to transmit the random access preamble or an UL data.

Besides, the processor 1623 of the UE 1620 is configured perform a function of processing information received by the UE 1620, information to be transmitted to an external, and the like. The memory 1624 is configured to store the processed information for a prescribed time and can be substituted by such a configuring element as a buffer (not depicted), or the like.

Detail configuration of the eNode B and the UE can be implemented to independently apply the aforementioned contents explained in various embodiments of the present invention or to simultaneously apply two or more embodiments. The overlapped contents are omitted for clarity of explanation.

And, in explaining FIG. 16, explanation on the eNode B 1610 can be identically applied to a relay as a main agent of DL transmission or a main agent of UL reception. Explanation on the UE 1620 can be identically applied to a relay as a main agent of DL reception or a main agent of UL transmission.

Embodiments of the present invention can be implemented using various means. For instance, embodiments of the present invention can be implemented using hardware, firmware, software and/or any combinations thereof.

In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

INDUSTRIAL APPLICABILITY

Although the aforementioned explanation describes the present invention in a manner of mainly concerning a form applied to a 3GPP LTE mobile communication system, the present invention can be used for various kinds of mobile communication systems with an identical or an equivalent principle.

What is claimed is:

1. A method of performing a random access, which is performed by a user equipment in a mobile communication system, comprising the steps of:
   transmitting a random access preamble using a resource determined according to a random access configuration for the user equipment; and
   receiving a random access response containing an uplink grant from an eNode B in response to the preamble transmission,
   wherein the random access configuration is determined by a group to which the user equipment belongs among a first random access configuration for a first user equipment group and a second random access configuration for a second user equipment group and wherein a resource reserved for the second user equipment group according to the second random access configuration is used to transmit the random access preamble or an uplink data,
   wherein if user equipments contained in the second user equipment group are included in a mobile relay node shortly before the user equipments try to access the eNode B, the user equipments contained in the second user equipment group initiates the random access according to a multicast handover command of the mobile relay node.

2. The method of claim 1, wherein the resource reserved for the second user equipment group according to the second random access configuration is used to transmit the uplink data of a user equipment contained in either the first user equipment group or the second user equipment group, before an initiation of a random access procedure or after a completion of the random access procedure.

3. The method of claim 1, wherein the second user equipment group comprises user equipments more than a preset number of user equipments simultaneously accessing the eNode B and wherein the first user equipment group comprises user equipments not belonging to the second user equipment group in a region of the eNode B.

4. The method of claim 1, wherein the second user equipment group comprises user equipments temporarily performing handover to the eNode B and wherein the first user equipment group comprises user equipments not belonging to the second user equipment group in a region of the eNode B.

5. The method of claim 1, wherein a resource reserved for the first user equipment group according to the first random access configuration is distinguished from a resource reserved for the second user equipment group according to the second random access configuration in at least one of a time domain or a frequency domain.

6. The method of claim 1, wherein the random access response is transmitted on PDSCH (Physical Downlink Shared Channel) indicated by PDCCH (Physical Downlink Control Channel) and wherein time-frequency resource corresponding PDSCH for the first user equipment group is different from time-frequency resource corresponding to PDSCH for the second user equipment group.

7. The method of claim 1, further comprising the step of transmitting a message containing identifier information of the user equipment on PUSCH (Physical Uplink Shared Channel) corresponding to the uplink grant, wherein time-frequency resource corresponding PUSCH for the first user equipment group is different from time-frequency resource corresponding PUSCH for the second user equipment group.

8. The method of claim 1, wherein the multicast handover command comprises an index of the user equipments contained in the second user equipment group and wherein the index corresponds to a resource determined according to the second random access configuration.

9. The method of claim 1, wherein the user equipments contained in the second user equipment group receives a multicast scheduling signal from the mobile relay node, wherein the multicast scheduling signal comprises an index of the user equipments contained in the second user equipment group, and wherein the index corresponds to an uplink resource or a downlink resource for each of the user equipments.

10. The method of claim 1, wherein the multicast handover message is valid only for a preset time period.

11. A method of performing a random access, which is performed by an eNode B in a mobile communication system, comprising the steps of:
- receiving a random access preamble transmitted on a resource determined according to a random access configuration from a user equipment; and
- transmitting a random access response containing an uplink grant in response to the preamble transmission,
- wherein the random access configuration is determined by a group to which the user equipment belongs among a first random access configuration for a first user equipment group and a second random access configuration for a second user equipment group and wherein a resource reserved for the second user equipment group according to the second random access configuration is used to transmit the random access preamble or an uplink data,
- wherein if user equipments contained in the second user equipment group are included in a mobile relay node shortly before the user equipments try to access the eNode B, the user equipments contained in the second user equipment group initiates the random access according to a multicast handover command of the mobile relay node.

12. A user equipment, which performs a random access in a mobile communication system, comprising:
- a transmission module; and
- a processor,
- wherein the processor controls to transmit a random access preamble using a resource determined according to a random access configuration for the user equipment, wherein the random access configuration is determined by a group to which the user equipment belongs among a first random access configuration for a first user equipment group and a second random access configuration for a second user equipment group, wherein a resource reserved for the second user equipment group according to the second random access configuration is used to transmit the random access preamble or an uplink data,
- wherein if user equipments contained in the second user equipment group are included in a mobile relay node shortly before the user equipments try to access the eNode B, the user equipments contained in the second user equipment group initiates the random access according to a multicast handover command of the mobile relay node.

13. An eNode B, which performs a random access in a mobile communication system, comprising:
- a transmission module; and
- a processor,
- wherein the processor controls to transmit a random access response containing an uplink grant in response to a random access preamble transmitted from a user equipment on a resource determined according to a random access configuration, wherein the random access configuration is determined by a group to which the user equipment belongs among a first random access configuration for a first user equipment group and a second random access configuration for a second user equipment group, wherein a resource reserved for the second user equipment group according to the second random access configuration is used to transmit the random access preamble or an uplink data,
- wherein if user equipments contained in the second user equipment group are included in a mobile relay node shortly before the user equipments try to access the eNode B, the user equipments contained in the second user equipment group initiates the random access according to a multicast handover command of the mobile relay node.

* * * * *